(12) United States Patent
Okayama et al.

(10) Patent No.: US 9,210,285 B2
(45) Date of Patent: Dec. 8, 2015

(54) IMAGE PROCESSING APPARATUS AND CONTROL METHOD FOR REDUCING AN AMOUNT OF DATA FOR A PLURALITY OF LANGUAGES

(75) Inventors: Noritsugu Okayama, Kawasaki (JP); Fumio Shoji, Komae (JP); Takao Ikuno, Yokohama (JP); Masahiro Odaira, Kawasaki (JP); Yoshiaki Katahira, Yokohama (JP); Toru Fujino, Kawaguchi (JP); Kenji Kasuya, Yokohama (JP); Yasuhito Niikura, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1842 days.

(21) Appl. No.: 11/571,606

(22) PCT Filed: Jul. 5, 2005

(86) PCT No.: PCT/JP2005/012727
§ 371 (c)(1),
(2), (4) Date: Nov. 16, 2007

(87) PCT Pub. No.: WO2006/004219
PCT Pub. Date: Jan. 12, 2006

(65) Prior Publication Data
US 2008/0252919 A1    Oct. 16, 2008

(30) Foreign Application Priority Data
Jul. 7, 2004  (JP) ................................. 2004-200799

(51) Int. Cl.
*G06F 17/00* (2006.01)
*H04N 1/00* (2006.01)
(Continued)

(52) U.S. Cl.
CPC .......... *H04N 1/00973* (2013.01); *G06F 9/4448* (2013.01); *H04N 1/0035* (2013.01);
(Continued)

(58) Field of Classification Search
CPC ...... G06F 17/289; G06F 9/4448; G06F 17/28
USPC .......................................................... 715/234
See application file for complete search history.

(56) References Cited

U.S. PATENT DOCUMENTS 5,428,673 A    6/1995  Nakagawa et al. ........... 379/100
5,684,604 A   11/1997  Nakajima et al. ............ 358/434
(Continued)

FOREIGN PATENT DOCUMENTS

| CA | 2333372 A | 4/2000 |
|---|---|---|
| JP | 11-316658 A | 11/1999 |

(Continued)

OTHER PUBLICATIONS

Howard J. Hamilton; "Files Systems, Physical View (Disk Allocation Methods)"; 16 pages; Mar. 7, 2004; http://www2.cs.uregina.ca/~hamilton/courses/330/notes/allocate/allocate.html    https://web.archive.org/web/20040307065652/http://www2.cs.uregina.ca/~hamilton/courses/330/notes/allocate/allocate.html.*

*Primary Examiner* — Scott Baderman
*Assistant Examiner* — Benjamin J Smith
(74) *Attorney, Agent, or Firm* — Fitzpatrick, Cella, Harper & Scinto

(57) ABSTRACT

This invention prevents repetitive storage of identical character string data, and efficiently uses a storage area. To accomplish this, a facsimile apparatus 8 has an NIC 1 as a network interface, and also has a display unit 4c as a display means for displaying an image as a user interface, a main body controller 3 including a memory as a storage means for storing character string data, a display controller 4b as an image generating means for generating an image to be displayed on the display means, by using the character string data stored in the memory, and an HTTP server as a display data generating means for generating an HTML file as display data described in a markup language by using the character string data stored in the memory, in accordance with a browsing request input via the network interface.

15 Claims, 5 Drawing Sheets

(51) Int. Cl.
*G06F 9/44* (2006.01)
*G06F 17/28* (2006.01)

(52) U.S. Cl.
CPC ........ *H04N1/00204* (2013.01); *G06F 17/2872* (2013.01); *H04N 2201/0039* (2013.01); *H04N 2201/0046* (2013.01)

(56) References Cited

U.S. PATENT DOCUMENTS

| | | | |
|---|---|---|---|
| 5,835,912 A * | 11/1998 | Pet | 1/1 |
| 6,088,131 A | 7/2000 | Imai et al. | 358/450 |
| 6,292,509 B1 | 9/2001 | Fujino | 375/222 |
| 6,301,016 B1 | 10/2001 | Matsueda et al. | 358/407 |
| 6,301,018 B1 | 10/2001 | Maeda et al. | 358/449 |
| 6,417,935 B1 | 7/2002 | Saito et al. | 358/450 |
| 6,442,252 B1 | 8/2002 | Fujise et al. | 379/100.01 |
| 6,476,935 B1 | 11/2002 | Fujino | 358/400 |
| 6,526,426 B1 * | 2/2003 | Lakritz | 715/264 |
| 6,563,607 B1 | 5/2003 | Nakamura et al. | 358/450 |
| 6,564,254 B1 * | 5/2003 | Shoji et al. | 709/217 |
| 6,934,740 B1 * | 8/2005 | Lawande et al. | 709/213 |
| 6,938,079 B1 * | 8/2005 | Anderson et al. | 709/222 |
| 6,993,568 B1 * | 1/2006 | Hauduc et al. | 709/217 |
| 7,096,420 B1 * | 8/2006 | Peikes | 715/205 |
| 7,262,871 B2 | 8/2007 | Matsueda et al. | 358/1.14 |
| 7,853,435 B2 * | 12/2010 | Dodge et al. | 702/183 |
| 2002/0010725 A1 * | 1/2002 | Mo | 707/530 |
| 2002/0123879 A1 * | 9/2002 | Spector | 704/2 |
| 2002/0156688 A1 * | 10/2002 | Horn et al. | 705/26 |
| 2003/0115552 A1 * | 6/2003 | Jahnke et al. | 715/536 |
| 2003/0120824 A1 | 6/2003 | Shattuck et al. | 709/313 |
| 2003/0140316 A1 * | 7/2003 | Lakritz | 715/536 |
| 2003/0188263 A1 | 10/2003 | Bates et al. | 715/513 |
| 2004/0056881 A1 * | 3/2004 | Nagatani et al. | 345/716 |
| 2004/0205463 A1 * | 10/2004 | Darbie | 715/500 |
| 2004/0237044 A1 * | 11/2004 | Travieso et al. | 715/530 |
| 2004/0260535 A1 * | 12/2004 | Chen et al. | 704/9 |
| 2004/0268256 A1 * | 12/2004 | Furuta et al. | 715/531 |
| 2005/0251562 A1 * | 11/2005 | Hauduc et al. | 709/217 |
| 2006/0200766 A1 * | 9/2006 | Lakritz | 715/536 |
| 2007/0055934 A1 * | 3/2007 | Adamson, III | 715/542 |

FOREIGN PATENT DOCUMENTS

| | | |
|---|---|---|
| JP | 2000-165587 | 6/2000 |
| JP | 2002-528792 | 9/2002 |
| JP | 2003-98907 | 4/2003 |
| WO | WO 00/23913 A1 | 4/2000 |

* cited by examiner

| ADDRESS ON MEMORY | MESSAGE ID | CHARACTER STRING DATA (JAPANESE) |
|---|---|---|
| 0x1000000 | 1001 | "名前" |
| 0x1000010 | 1002 | "デンワバンゴウトウロク" |
| 0x1000020 | 1003 | "用紙設定" |
| 0x1000030 | 1004 | "キータッチ音量" |
| ⋮ | ⋮ | ⋮ |
| 0x11FFF0 | 1999 | " " |

402

| ADDRESS ON MEMORY | MESSAGE ID | CHARACTER STRING DATA (ENGLISH) |
|---|---|---|
| 0x1200000 | 1001 | "NAME" |
| 0x1200010 | 1002 | "TEL# REGISTRATION" |
| 0x1200020 | 1003 | "PAPER SETTINGS" |
| 0x1200030 | 1004 | "KEY PAD VOLUME" |
| ⋮ | ⋮ | ⋮ |
| 0x12FFF0 | 1999 | " " |

IMAGE PROCESSING APPARATUS AND CONTROL METHOD FOR REDUCING AN AMOUNT OF DATA FOR A PLURALITY OF LANGUAGES

TECHNICAL FIELD

The present invention relates to an image processing apparatus including a network interface, and a control method of the same.

BACKGROUND ART

Recently, as one type of image processing apparatus, apparatuses including a network interface and having a function of transmitting display data in response to a browsing request from a terminal on a network exist (Japanese Patent Laid-Open No. 11-316658). Of these image processing apparatuses, an apparatus including a display means such as a liquid crystal display is known, and this apparatus further includes a function of generating an image to be displayed on the display means.

Display data transmitted across the network and image data to be displayed on the display means often include exactly the same character string data.

The above conventional image processing apparatus, however, separately stores the display data transmitted across the network and the image data to be displayed on the display means.

Accordingly, since identical character string data are repetitively stored, the storage area is redundantly used for storing the display data and image data. This cause the productivity of the apparatus itself to decrease.

DISCLOSURE OF INVENTION

The present invention has been made to solve the above problem of the prior art, and provides an image processing apparatus capable of efficiently using character string data.

One aspect of the present invention is an image processing apparatus having a network interface, characterized by comprising, display means for displaying an image as a user interface, storage means for storing character string data, image generating means for generating an image to be displayed on the display means, by using the character string data stored in the storage means, and display data generating means for generating display data described in a markup language by using the character string data stored in the storage means, in accordance with a browsing request input via the network interface.

Other features and advantages of the present invention will be apparent from the following description taken in conjunction with the accompanying drawings, in which similar reference characters designate the same or similar parts throughout the figures.

BRIEF DESCRIPTION OF DRAWINGS

FIG. 4 is a view showing character string tables on a memory space included in the facsimile apparatus as the embodiment of the present invention.

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(Arrangements)

Figure 1:
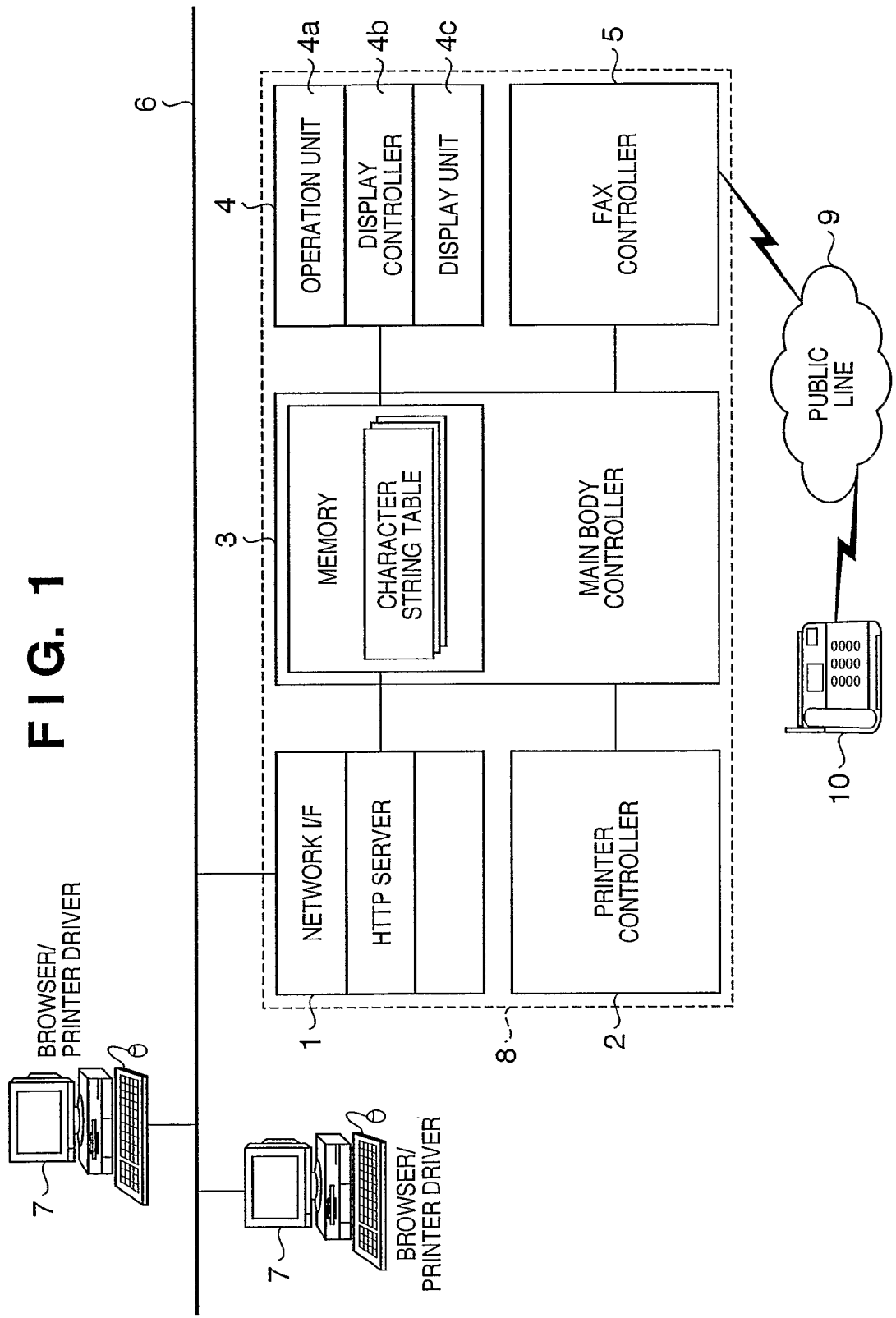
FIG. 1 is a schematic view for explaining the internal arrangement of a facsimile apparatus as an embodiment of the present invention and the peripheral environment of the facsimile apparatus.

FIG. 1 is a view for explaining the internal arrangement of a facsimile apparatus 8 as an embodiment of the present invention, and a peripheral environment to which the facsimile apparatus 8 is applicable.

The facsimile apparatus 8 roughly comprises a network interface (NIC) 1, printer controller 2, main body controller 3, operation panel 4, and FAX controller 5. The FAX controller 5 connects to a public line 9, and can communicate with another facsimile apparatus 10 or the like by a facsimile protocol. The operation panel 4 includes an operation unit 4a having buttons and the like, a display unit 4c which is a liquid crystal display, and a display controller 4b which controls display on the display unit 4c.

Also, in FIG. 1, the facsimile apparatus 8 is connected to a network 6 such as a LAN. A plurality of terminals 7 such as PCs for remote operations can be connected to the network 6, and a user can perform remote operations by designating the network address of the facsimile apparatus 8 as an HTTP server and accessing the address from browser software running on the terminal 7.

The user can also control the facsimile apparatus 8 by operating the operation unit 4a while viewing messages displayed on the display unit 4c.

(Operations)

Figure 2:
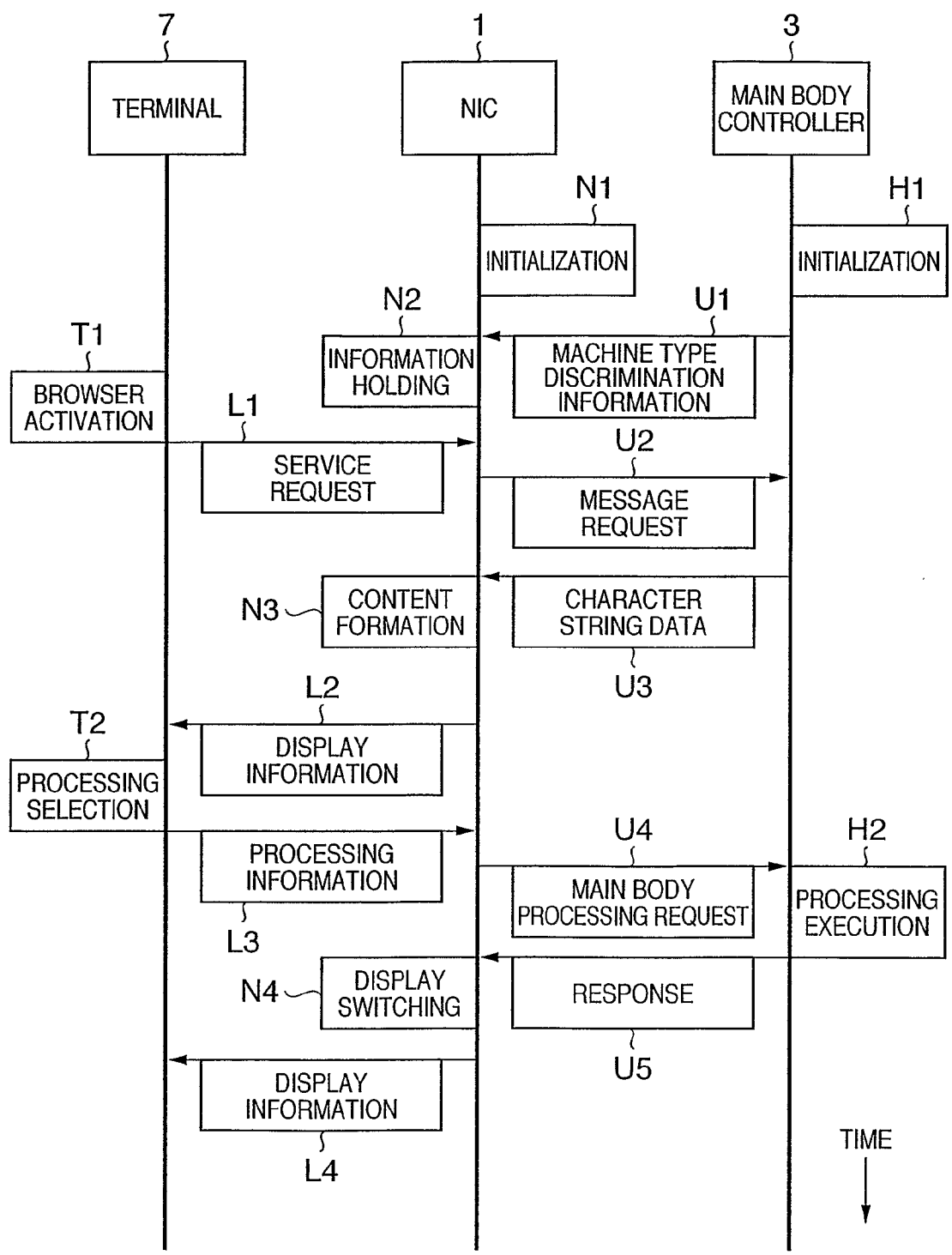
FIG. 2 is a sequence diagram for explaining the flows of processing between a NIC and main body controller included in the facsimile apparatus as the embodiment of the present invention, and a terminal connected across a network to the facsimile apparatus.

FIG. 2 expresses, in a time series manner, the operations of the terminal 7, NIC 1, and main body controller 3, and the flows of information between them.

When the power supply of the main body is turned on, the NIC 1 and main body controller 3 perform initialization by interlocking with each other (N1/H1). After that, the main body controller 3 transfers information necessary for discrimination of the machine type to the NIC 1 (U1). The NIC 1 stores the information, and prepares for content formation corresponding to the machine type (N2).

When the user of the terminal 7 activates the browser and designates the address of the NIC 1 (T1), a service request arrives at the NIC 1 across the LAN (L1). The NIC 1 requests the main body controller 3 for information, such as an external appearance view of the product and facsimile transmission/reception result information necessary to generate contents, and character string data (U2). In response to this request, the main body controller 3 transfers predetermined information and character string data to the NIC 1 (U3). The NIC 1 generates contents on the basis of these pieces of information (N3). More specifically, the NIC 1 forms an HTML file by, e.g., invoking a CGI (Common Gateway Interface) and embedding SSI (Server Side Include) and the received character string data.

After that, the NIC 1 returns, as a response of the service, HTML file information to be displayed on the browser of the terminal 7 (L2), so the user can browse the information related to the facsimile apparatus 8 on the browser of the terminal 7.

When the user wants to perform an operation such as rewrite of information in the facsimile apparatus 8, selection of a display language, or stoppage of processing currently being executed, he or she selects processing on the browser in accordance with the contents (T2). When the information has arrived at the NIC 1 via the LAN (L3), the NIC 1 executes predetermined processing by using the CGI or SSI, and issues an operation request to the main body controller 3 (U4). If the requested processing is successfully performed in the main body controller 3 (H2), a response is returned (U5), and the NIC 1 switches images to be displayed in accordance with the response (N4), and returns display information (L4).

By repeating the same processing after that, it is possible to continuously perform display of the main apparatus information and a remote operation of the apparatus.

Figure 3:
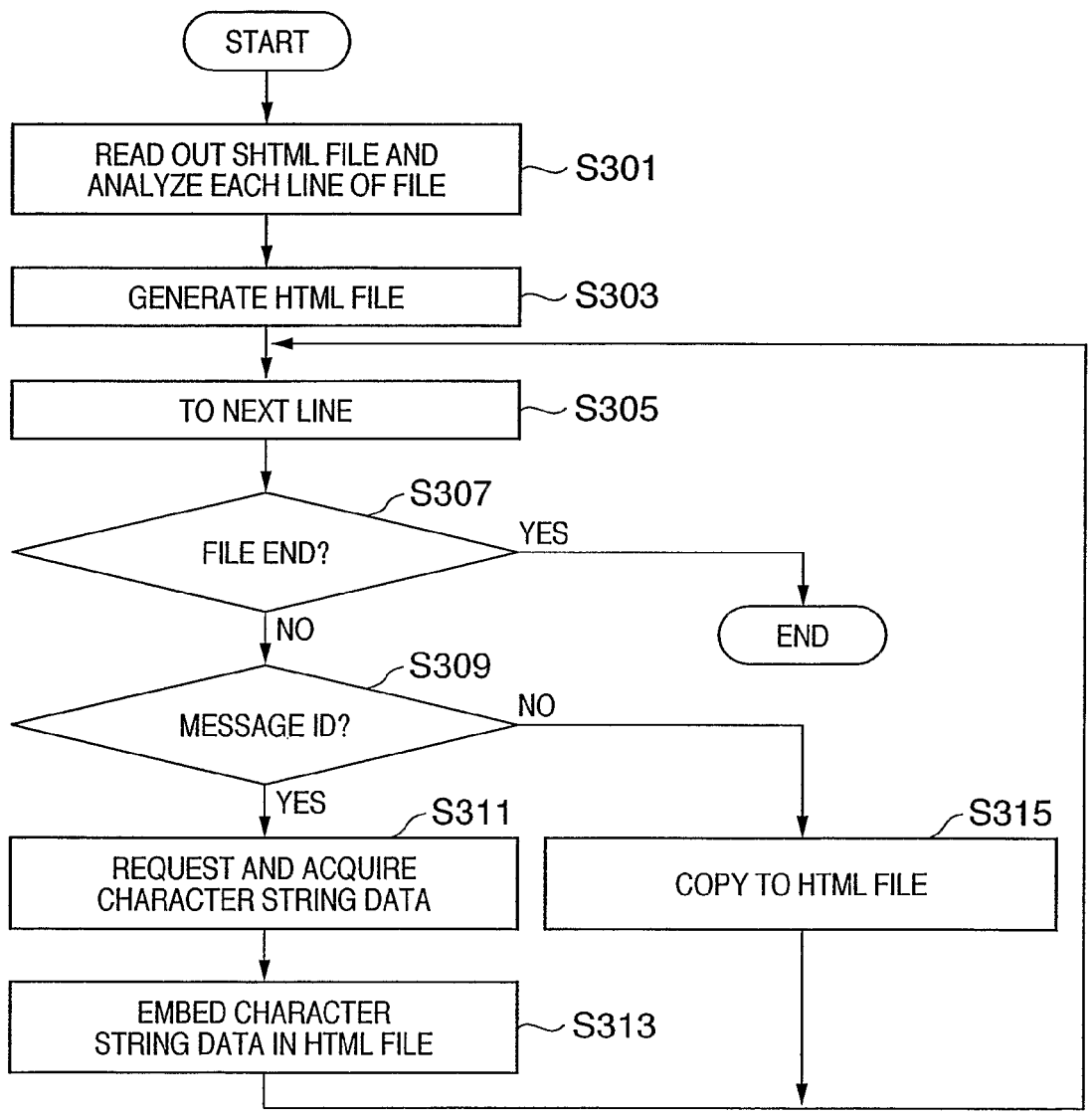
FIG. 3 is a flowchart showing a content formation process performed by an HTTP server included in the facsimile apparatus as the embodiment of the present invention.

FIG. 3 is a flowchart showing the flow of the content formation process indicated by N3 in FIG. 2.

The NIC 1 responds to a service request from the terminal 7 (L1), reads out an SHTML file as a basis from the HTTP server, and analyzes each line of the file (S301). The SHTML file prestored in the HTTP server contains no character string data, and all pieces of information concerning a character string are described in the form of a message ID independent of a language.

A CGI program for generating an empty HTML file is embedded in the first line of the SHTML file, and an empty HTML file is generated by executing this CGI program (S303).

Then, the flow advances to step S305 to analyze the next line. In step S307, whether a file end is described in the line being analyzed is checked, and, if a file end is found, the analysis is immediately terminated.

If no file end is found in the line being analyzed, the flow advances to step S309 to check whether a message ID is embedded. If a message ID is embedded in the line being analyzed, the flow advances to step S311, and the message ID and a requested language setting value are transferred to the main body controller 3 to request character string data. When character string data is transferred from the main body controller 3 in response to this request, the character string data is accepted and embedded in the HTML file generated in step S303 (S313).

On the other hand, if it is determined in step S309 that no message ID is embedded in the line being analyzed, the description of the SHTML file is directly copied to the HTML file (S315).

The HTML file is dynamically formed by thus reading the SHTML file to the file end (S307).

For example, if a message ID, 1004, is described in the SHTML file and the requested language is English, "PAPER SETTINGS" is copied as a character string to the HTML file. The dynamically formed HTML file is returned in (L2).

FIG. 4 is a view showing character string tables stored on a memory space in the main body controller 3. As shown in FIG. 4, a character string table 401 showing the correspondence of Japanese character string data to message IDs and a character string table 402 showing the correspondence of English character string data to message IDs are arranged on a common memory space. On the basis of a message ID and language setting value, the main body controller 3 can derive an address on the memory. As shown in FIG. 4, character string data corresponding to the same message ID are character strings representing the same meaning regardless of the language.

Although the character string table 401 for Japanese and the character string table 402 for English are shown in this embodiment, the present invention is not limited to this, and it is also possible to store the correspondence of character string data represented by other languages (e.g., Chinese, Korean, French, Italian, and German) to message IDs. These character string tables are desirably arranged on a common memory space in this case as well.

Figure 5:
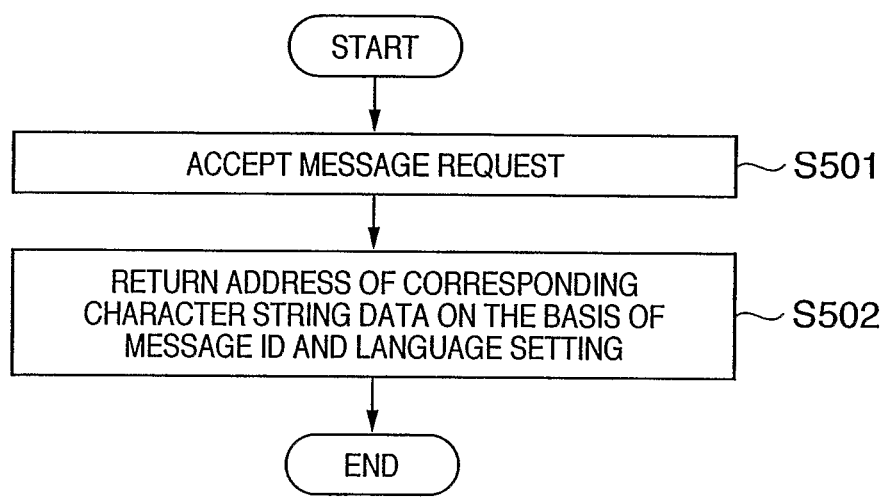
FIG. 5 is a flowchart showing processing performed in response to a message request by the main body controller included in the facsimile apparatus as the embodiment of the present invention.

FIG. 5 is a flowchart showing the flow of processing performed in response to a message request by the main body controller 3.

When a desired character string is to be displayed on the display unit 4*c* in accordance with a user's operation on the operation unit 4*a*, the display controller 4*b* of the main body requests the main body controller 3 for character string data by designating a message ID.

When accepting the request for the character string data specified by the message ID from the display controller 4*b* of the main body (S501), the main body controller 3 checks an address in which the character string is stored, on the basis of the accepted message ID and a language setting value (a value which defines a language to be used to display a character string) preset as registered data of the apparatus by the user, and returns the address (S502). The display controller 4*b* accesses the memory on the basis of the returned address, and reads out desired character string data. For example, if the language setting value is Japanese and the message ID is 1001, character string data ""名前"" is obtained from the correspondence table 401 shown in FIG. 4.

Note that the language setting value set as registered data of the apparatus can be changed within a range predetermined in the apparatus by a user's operation on the operation unit 4*a*. It is only necessary to display a selection menu for selecting English or Japanese on the display unit 4*c*, and set the language setting value as registered data in accordance with user's selection.

On the other hand, even when character string data is requested from the HTTP server of the NIC 1 by a remote operation across the network (S311 in FIG. 3), the main body controller 3 performs substantially the same operation. When a language is selected on a certain terminal 7 by the processing in T2 of FIG. 2, the HTTP server of the NIC 1 holds a language setting value corresponding to the language by making the value correspond to the terminal 7. That is, the HTTP stores a table showing the correspondence of language setting values with terminals. Accordingly, when a display request is issued from the terminal 7 after that, the HTTP server reads out the language setting value corresponding to the terminal 7, designates the language setting value and the message ID, and requests the main body controller 3 for character string data. The processing shown in FIG. 5 is performed in response to this request, and the main body controller 3 accepts a message request containing the language setting value and message ID (S501), and, on the basis of the accepted message ID and language setting value, checks and returns an address in which the character string data is stored (S502). The HTTP server accesses the memory on the basis of the returned address, and reads out the desired character string data.

That is, the main body controller 3 performs exactly the same processing when HTML data is to be generated by the HTTP server in order to display a character string on the browser of the terminal 7, and when a character string is to be displayed on the display unit 4c.

Note that when a display request is issued from the terminal 7, if the HTTP server does not store any language setting value corresponding to the terminal 7, the HTTP server requests the main body controller 3 for character string data by using the language setting value set and registered by the display controller 4b.

In this embodiment, an HTML file is generated from an SHTML file and displayed on the terminal 7 in accordance with a request from the browser of the terminal 7. However, the display controller 4b may also operate the browser to develop an HTML file and generate a display image.

As described above, the facsimile apparatus 8 as an embodiment of the image processing apparatus according to the present invention has the NIC 1 as a network interface, and also has the display unit 4c as a display means for displaying an image as a user interface, the main body controller 3 including a memory as a storage means for storing character string data, the display controller 4b as an image generating means for generating an image to be displayed on the display means by using the character string data stored in the memory, and the HTTP server as a display data generating means for generating an HTML file as display data described in a markup language by using the character string data stored in the memory in accordance with a browsing request input via the network interface. Since the character string data stored in the storage means is shared by image data to be displayed on the display unit and display data transmitted across the network, it is possible to prevent repetitive storage of the character string data, and realize efficient use of the storage area of the memory.

Also, in the facsimile apparatus 8 described above, the memory stores message IDs as a plurality of identifiers for identifying the meanings of messages, and character string data in a plurality of languages corresponding to each message ID. The HTTP server as a display data generating means stores an SHTML file as template display data in which a message ID is embedded, reads out, from the memory, character string data corresponding to the message ID contained in the SHTML file and expressed in a predetermined language, and generates an HTML file as display data by using the readout character string data and SHTML file. This allows one SHTML file to correspond to a plurality of languages. That is, it is no longer necessary to store an HTML file for each of a plurality of languages, so the storage area of the memory can be used more efficiently.

Furthermore, as described in the paragraph after the explanation using FIG. 5, the HTTP server as a display data generating means in the facsimile apparatus 8 stores a language setting corresponding to a terminal 7 having transmitted a browsing request, specifies the terminal 7 as the transmission source of the browsing request, reads out the language setting corresponding to the terminal 7, reads out character string data corresponding to the readout language setting from the memory, and generates an HTML file as display data. When the correspondence of terminals with language settings is stored as described above, the user of a terminal need not designate the language of display data whenever accessing the facsimile apparatus 8, so the load on the user can be reduced.

[Other Embodiments]

Though the embodiment of the present invention has been detailed above, the invention may be applied to a system constituted by a plurality of devices, or an apparatus comprising a single device.

Further, the invention can be implemented by supplying a software program, which implements the functions of the foregoing embodiments, directly or remotely to a system or apparatus, reading the supplied program code with a computer of the system or apparatus, and then executing the program code. Accordingly, since the functions of the present invention are implemented by computer, the program code installed in the computer is also included within a technical scope of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, an MO, a CD-ROM, a CD-R, a CD-RW, a magnetic tape, a non-volatile type memory card, a ROM, and a DVD (DVD-ROM and DVD-R).

As for the method of supplying the program, a client computer can be connected to a home page on the Internet using a browser of the client computer, and the computer program of the present invention or an automatically-installable compressed file of the program can be downloaded from the home page to a recording medium such as a hard disk. Further, the program of the present invention can be supplied by dividing the program code constituting the program into a plurality of files and downloading the files from different home pages. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a home page via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing according to the instructions of the program, so that the functions of the foregoing embodiments can be implemented by this processing.

Further, after the program read from the storage medium is written to a function expansion board inserted into the computer or to a memory provided in a function expansion unit connected to the computer, a CPU or the like mounted on the function expansion board or function expansion unit performs all or a part of the actual processing according to the instructions of the program, so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

Claim of Priority

This application claims priority from Japanese Patent Application No. 2004-200799 filed on Jul. 7, 2004, the entire contents of which are hereby incorporated by reference herein.

The invention claimed is:

1. An image processing apparatus that includes a network interface, the apparatus comprising:

a display unit adapted to display image data as a user interface;

a storage unit adapted to store a plurality of tables each has a common set of message identifiers and a plurality of character strings written in different languages in a different memory address;

an image generating unit adapted to generate the image data to be displayed by said display unit, by reading out from said storage unit a character string expressed in the language to be used in the image data, based on a memory address derived on the basis of the message identifier and a language to be used in the image data, and using an HTML file having at least one of the message identifier and the character string read out from the storage unit;

a markup data generating unit adapted to store template data related to the message identifier, and to generate markup data described in a markup language based on the template data and the character string, wherein the character string is read out from the storage unit based on the message identifier and the language to be used in the image data, in response to a browsing request input via said network interface; and an HTTP server adapted to transmit the markup data generated by said markup data generating unit to another terminal, in response to the browsing request input from said other terminal via said network interface.

2. The image processing apparatus according to claim 1, wherein said markup data generating unit stores a language setting corresponding to the other terminal that transmitted the browsing request, specifies the other terminal as a transmission source of the browsing request, reads out the language setting corresponding to the other terminal, and generates the image data by reading out the character string corresponding to the readout language setting, from said storage unit.

3. The image processing apparatus according to claim 2, wherein when accepting a designation of the language setting from the other terminal as the transmission source of the browsing request, said markup data generating unit stores the language setting in association with information identifying the other terminal.

4. The image processing apparatus according to claim 3, wherein
said image generating unit sets the language to be use in the image data for use in an image to be displayed by said display unit, and
if the designation of the language setting from the other terminal as the transmission source of the browsing request is not accepted, said markup data generating unit generates markup data by reading out the character string in the language corresponding to the language setting set in said image generating unit.

5. The image processing apparatus according to claim 1, wherein said image generating unit sets the language to be used in the image data for use in an image to be displayed by said display unit.

6. The image processing apparatus according to claim 1, wherein said display unit displays, by using a browser, the markup data generated by said markup data generating unit.

7. A control method of an image processing apparatus that includes a network interface and a storage unit that stores a plurality of character strings, the method comprising:
generating image data by using a character string stored in the storage unit based on a memory address derived on the basis of a message identifier and a language to be used in the image data, and using an HTML file having at least one of the message identifier and the character string read out from the storage unit;

displaying the image data as a user interface;

inputting an image browsing request via the network interface;

generating markup data described in a markup language by using the character string stored in the storage unit, in response to the inputting of the browsing request;

transmitting, by an HTTP server, the markup data to another terminal, in response to the inputting of the browsing request, wherein the storage unit stores a plurality of tables each has a common set of message identifiers and a plurality of character strings written in different languages, in a different memory address, and said storage unit stores template data related to the message identifier, and the generating of the markup data includes reading out, from the storage unit, the character string associated with the message identifier and expressed in a predetermined language, and generating the markup data by using the readout character string and the template data.

8. The control method according to claim 7, wherein said displaying of the image data includes displaying, by using a browser, the generated markup data.

9. A non-transitory computer-readable storage medium storing a control program of an image processing apparatus that includes a network interface and a storage unit that stores a plurality of character strings, the control program causing the image processing apparatus to perform a method comprising:
generating image data by using a character string stored by the storage unit based on a memory address derived on the basis of a message identifier and a language to be used in the image data, and using an HTML file having at least one of the message identifier and the character string read out from the storage unit;

displaying the image data as a user interface;

inputting an image browsing request via the network interface;

generating markup data described in a markup language by using the character string stored in the storage unit, in response to the inputting of the browsing request;

transmitting, by an HTTP server, the markup data to another terminal, in response to the inputting of the browsing request, wherein the storage unit stores a plurality of tables each has a common set of message identifiers and a plurality of character strings written different languages, in a different memory address, and said storage unit stores template data related to the message identifier, and the generating of the markup data includes reading out, from the storage unit, a character string associated with the message identifier and expressed in a predetermined language, and generating the markup data by using the readout character string and the template data.

10. The non-transitory computer-readable storage medium according to claim 9, wherein said displaying of the image data includes displaying, by using a browser, the generated markup data.

11. An image processing apparatus that includes a network interface, the apparatus comprising:
a non-transitory computer-readable storage medium adapted to store a plurality of tables each has a common set of message identifiers and a plurality of character strings written in different languages in a different memory address;

an image generating unit adapted to generate image data to be displayed by a display unit, by reading out from said storage medium a character string expressed in the language to be used in the image data based on a memory address derived on the basis of the message identifier and a language to be used in the image data, and using an HTML file having at least one of the message identifier and the character string read out from the storage unit;

a markup data generating unit adapted to store template data related to the message identifier, and to generate markup data described in a markup language based on the template data and the character string, wherein the character string is read out from the storage medium based on the message identifier and the language to be used in the image data, in response to a browsing request input via said network interface; and an HTTP server adapted to transmit the markup data generated by said markup data generating unit to another terminal, in response to the browsing request input from said other terminal via said network interface.

12. A method performed by an image processing apparatus that includes a network interface, the method comprising:

storing a plurality of tables each has a common set of message identifiers and a plurality of character strings written in different languages in a different memory address;

generating image data, by reading out a character string expressed in the language to be used in the image data based on a memory address derived on the basis of the message identifier and a language to be used in the image data, and using an HTML file having at least one of the message identifier and the character string read out from the storage unit;

storing template data related to the message identifier;

generating markup data described in a markup language based on the template data and the character string, wherein the character string is read out based on the message identifier and the language to be used in the image data, in response to a browsing request input via said network interface; and transmitting, by an HTTP server, the generated markup data to another terminal, in response to the browsing request input from said other terminal via said network interface.

13. An image processing apparatus that includes a network interface, the apparatus comprising:

a display unit adapted to display image data as a user interface;

a storage unit adapted to store a plurality of tables each has a common set of message identifiers and a plurality of character strings written in different languages in a different memory address;

an image generating unit adapted to generate the image data to be displayed by said display unit, by reading out from said storage unit a character string expressed in the language to be used in the image data based on a memory address derived on the basis of the message identifier and a language to be used in the image data, and using an HTML file having at least one of the message identifier and the character string read out from the storage unit; and a markup data generating unit adapted to store template data related to the message identifier, and to generate markup data described in a markup language based on the template data and the character string, wherein the character string is read out from the storage unit based on the message identifier and the language to be used in the image data, in response to a browsing request input via said network interface, wherein said display unit displays, by using a browser, the markup data provided via an HTTP server.

14. A control method of an image processing apparatus that includes a network interface and a storage unit that stores a plurality of character strings, the method comprising:

displaying image data as a user interface;

storing a plurality of tables each has a common set of message identifiers and a plurality of character strings written in different languages in a different memory address;

generating the image data to be displayed by said display unit, by reading out a character string expressed in the language to be used in the image data based on a memory address derived on the basis of the message identifier and a language to be used in the image data, and using an HTML file having at least one of the message identifier and the character string read out from the storage unit;

storing template data related to the message identifier; and generating markup data described in a markup language based on the template data and the character string, wherein the character string is read out from the storage unit based on the message identifier and the language to be used in the image data, in response to a browsing request input via said network interface, wherein the displaying of the image data includes displaying, by using a browser, the markup data provided via an HTTP server.

15. A non-transitory computer-readable storage medium storing a control program of an image processing apparatus that includes a network interface and a storage unit that stores a plurality of character strings, the control method causing the image processing apparatus to perform a method comprising:

displaying image data as a user interface;

storing a plurality of tables each has a common set of message identifiers and a plurality of character strings written in different languages, in a different memory address;

generating the image data to be displayed by said display unit, by reading out a character string expressed in the language to be used in the image data based on a memory address derived on the basis of the message identifier and a language to be used in the image data, and using an HTML file having at least one of the message identifier and the character string read out from the storage unit;

storing template data related to the message identifier; and generating markup data described in a markup language based on the template data and the character string, wherein the character string is read out from the storage unit based on the message identifier and the language to be used in the image data, in response to a browsing request input via said network interface, wherein the displaying of the image data includes displaying, by using a browser, the markup data provided via an HTTP server.

* * * * *